United States Patent
Mattsson et al.

(10) Patent No.: US 9,773,125 B2
(45) Date of Patent: *Sep. 26, 2017

(54) TOKENIZATION COLUMN REPLACEMENT

(71) Applicant: Protegrity Corporation, Grand Cayman (KY)

(72) Inventors: Ulf Mattsson, Cos Cob, CT (US); Yigal Rozenberg, Wilton, CT (US); Vichai Levy, Norwalk, CT (US)

(73) Assignee: Protegrity Corporation, Grand Cayman (KY)

( * ) Notice: Subject to any disclaimer, the term of this patent is extended or adjusted under 35 U.S.C. 154(b) by 49 days.

This patent is subject to a terminal disclaimer.

(21) Appl. No.: 14/958,705

(22) Filed: Dec. 3, 2015

(65) Prior Publication Data
US 2016/0092698 A1    Mar. 31, 2016

Related U.S. Application Data (63) Continuation of application No. 14/042,311, filed on Sep. 30, 2013, now Pat. No. 9,230,136.

(51) Int. Cl.
*G06F 21/62* (2013.01)
*G06F 21/64* (2013.01)
*G06F 17/30* (2006.01)
*G06F 21/60* (2013.01)

(52) U.S. Cl.
CPC .... *G06F 21/6254* (2013.01); *G06F 17/30979* (2013.01); *G06F 21/604* (2013.01); *G06F 21/64* (2013.01)

(58) Field of Classification Search
CPC ............... G06F 21/6254; G06F 21/604; G06F 17/30979; G06F 21/64
See application file for complete search history.

(56) References Cited

U.S. PATENT DOCUMENTS 7,016,903 B1 * 3/2006 Thusoo ............. G06F 17/30592
9,152,910 B2   10/2015 Kuo et al.
(Continued)

FOREIGN PATENT DOCUMENTS

EP      0855656      7/1998

OTHER PUBLICATIONS

United States Office Action, U.S. Appl. No. 14/042,311, Jul. 15, 2015, 15 pages.

(Continued)

*Primary Examiner* — Eleni Shiferaw
*Assistant Examiner* — Mary Li
(74) *Attorney, Agent, or Firm* — Fenwick & West LLP (57) ABSTRACT

A tokenization system includes a vector table and one or more token tables. The tokenization system accesses sensitive data and a vector from a vector table column, and modifies the sensitive data based on the accessed vector. The tokenization system then queries the one or more token tables using a portion of the modified data to identify a token mapped to the portion of the modified data. The portion of the modified data is replaced with the token to create tokenized data. The vector table can be updated by replacing a vector table column with an updated vector table column. The tokenization system can modify subsequent data using the updated vector column prior to tokenization.

20 Claims, 4 Drawing Sheets

(56) References Cited

U.S. PATENT DOCUMENTS

2009/0249082 A1* 10/2009 Mattsson ............ G06F 21/6218
713/193
2011/0154466 A1* 6/2011 Harper .................. G06F 21/335
726/9
2013/0246789 A1 9/2013 Tzeng et al.

OTHER PUBLICATIONS

United States Office Action, U.S. Appl. No. 14/042,311, Mar. 23, 2015, 15 pages.

* cited by examiner

TOKENIZATION COLUMN REPLACEMENT

CROSS REFERENCE TO RELATED APPLICATIONS

This application is a continuation of U.S. application Ser. No. 14/042,311, filed Sep. 30, 2013, now U.S. Pat. No. 9,230,136, which is incorporated by reference in its entirety.

FIELD OF ART

This application relates to the field of data protection, and more specifically to the protection of information using tokenization.

BACKGROUND

Many websites, services, and applications implement various data protection techniques. Certain techniques involve the use of an encryption key or password that can be subject to interception or brute force guessing. Other methods may protect data but require extensive computing resources to encode and decode data. Such methods often fail to utilize various data format advantages when protecting the data. In addition, such methods often result in the re-use of secrets, such as encryption keys, encryption algorithms, and the like. This makes such methods particularly vulnerable to hacking or compromise. Thus, it may be advantageous to implement data protection techniques that minimize the re-use of secrets while bolstering the protection of the data.

SUMMARY

The security of tokenization operations can be increased by replacing one or more tokenization components in a tokenization system. Vectors for modifying data prior to tokenization are examples of such tokenization components. Data can be tokenized by modifying the data with a vector from a vector table column and by querying a token table with the modified data. An updated vector column can be accessed, and a column of the vector table can be replaced by the updated vector column. Second data can be tokenized by modifying all or part of the second data with a vector from the updated vector table column. Even in the event that the original vector table column is accessed by an unauthorized party, the unauthorized party may not have access to the updated vector column, protecting data tokenized with the updated vector column from being accessed by the unauthorized party.

The updated vector columns can be requested from and provided by a vector table server. Alternatively, the updated vector columns can be generated by a tokenization system, for instance based on a column of a current vector table. Updated vector columns can be accessed in response to the passage of a pre-determined period of time. Alternatively, updated vector columns can be accessed in response to the performance of a pre-determined number of tokenization operations. In addition to replacing vector table columns with updated vector columns, updated token columns can accessed and can replace token table columns.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

The figures (Figs.) depict embodiments for purposes of illustration only. One skilled in the art will readily recognize from the following description that alternative embodiments of the structures and methods illustrated herein can be employed without departing from the principles of the invention described herein.

DETAILED DESCRIPTION

Reference will now be made in detail to several embodiments, examples of which are illustrated in the accompanying figures. It is noted that wherever practicable, similar or like reference numbers can be used in the figures and can indicate similar or like functionality. The figures depict embodiments of the disclosed system (or method) for purposes of illustration only. One skilled in the art will readily recognize from the following description that alternative embodiments of the structures and methods illustrated herein can be employed without departing from the principles described herein.

Tokenization Overview

The transmission and storage of sensitive data, such as passwords, credit card numbers, social security numbers, bank account numbers, driving license numbers, transaction information, date information, etc, can be challenging. Before sensitive data can be transmitted or stored, the sensitive data can be tokenized into tokenized data to prevent an unauthorized entity from accessing the data.

As used herein, the tokenization of data refers to the generation of tokenized data by querying one or more token tables mapping input values to tokens with the one or more portions of the data, and replacing the queried portions of the data with the resulting tokens from the token tables. Tokenization can be combined with encryption for increased security, for example by encrypting sensitive data using a mathematically reversible cryptographic function (e.g., datatype-preserving encryption or DTP), a one-way non-reversible cryptographic function (e.g., a hash function with strong, secret salt), or a similar encryption before or after the tokenization of the sensitive data. Any suitable type of encryption can be used in the tokenization of data. A detailed explanation of the tokenization process can be found in U.S. patent application Ser. No. 13/595,439, filed Aug. 27, 2012, which is hereby incorporated by reference.

As used herein, the term token refers to a string of characters mapped to an input string of characters in a token table, used as a substitute for the string of characters in the creation of tokenized data. A token can have the same number of characters as the string being replaced, or can have a different number of characters. Further, the token can have characters of the same type (such as numeric, symbolic, or alphanumeric characters) as the string of characters being replaced or characters of a different type.

Any type of tokenization can be used to perform the functionalities described herein. One such type of tokenization is static lookup table ("SLT") tokenization. SLT tokenization maps each possible input values (e.g., possible character combinations of a string of characters) to a particular token. An SLT includes a first column comprising permutations of input string values, and can include every possible input string value. The second column of an SLT includes tokens, with each associated with an input string value of the first column. Each token in the second column can be unique among the tokens in the second column. Optionally, the SLT can also include one or several additional columns with additional tokens mapped to the input string values of the first column, for example for use in subsequent tokenization operations.

In some embodiments, to increase the security of tokenization, sensitive data can be tokenized two or more times using the same or additional token tables. This process is referred to as tokenization "chaining". For example, the first 8 digits of a 16 digit credit card number can be tokenized with an 8 digit token table to form first tokenized data, and the last 12 digits of the first tokenized data can be tokenized using a 12 digit token table to form second tokenized data. In another example, the first 4 digits of a credit card number are tokenized using a first token table, the second 4 digits are tokenized with a second token table, the third 4 digits are tokenized with a third token table, and the last 4 digits are tokenized with a fourth token table. Certain sections of the sensitive data can also be left un-tokenized; thus a first subset of the resulting tokenized data can contain portions of the sensitive data and a second subset of the tokenized data can contain a tokenized version of the sensitive data.

Dynamic token lookup table ("DLT") tokenization operates similarly to SLT tokenization, but instead of using static tables for multiple tokenizations, a new token value is generated and included in a token table entry each time sensitive data is tokenized. The new token value can be generated randomly, can be randomly selected from among a set of values, or can be generated via any other suitable means. A seed value can be used to generate token values, to select a set of values from which to select a token value from among multiple sets of values, or to randomly select a value from among a set of values for use as the token value. It should be noted that as used herein, "randomly" can refer to pseudo-randomly or substantially randomly. The seed value can include a portion of data being tokenized.

In some embodiments, a DLT can map portions of sensitive data being replaced by a token to a token. The DLT can include the entire sensitive data (including portions of the sensitive data that are not replaced by a token), and the DLT can indicate the portion of the sensitive data being replaced by the token and can map the portion to the token. DLTs can in some configurations provide a higher level of security compared to SLT but may require the storage and/or transmission of a large amount of data associated with each of the generated token tables. It should be noted that DLT tokenization can be used to tokenize data according to the principles described above with regards to SLT tokenization. Although the methods described herein can apply to DLT tokenization, the remainder of the description will be limited to SLT tokenization for the purposes of simplicity.

The security of tokenization can be further increased through the use of initialization vectors ("IVs"). An initialization vector is a string of data used to modify sensitive data prior to tokenizing the sensitive data. Example sensitive data modification operations include performing linear or modulus addition on the IV and the sensitive data, performing logical operations on the sensitive data with the IV, encrypting the sensitive data using the IV as an encryption key, and the like. The IV can be a portion of the sensitive data. For example, for a 12-digit number, the last 4 digits can be used as an IV to modify the first 8 digits before tokenization. IVs can also be retrieved from an IV table, received from an external entity configured to provide IVs for use in tokenization, or can be generated based on, for instance, the identity of a user, the date/time of a requested tokenization operation, based on various tokenization parameters, and the like. Data modified by one or more IVs that is subsequently tokenized includes an extra layer of security—an unauthorized party that gains access to the token tables used to tokenized the modified data will be able to detokenize the tokenized data, but will be unable to de-modify the modified data without access to the IVs used to modify the data.

Vectors can also be used to modify data between chained tokenization operations. Such vectors are referred to herein as "chained vectors" ("CVs"). For example, sensitive data can first be modified by an IV, can be tokenized in a first chained tokenization operation, can be further modified by a CV, and then can be tokenized in a second chained tokenization operation. As described above with regards to IVs, a CV can be used to modify data by performing modulo addition on the CV and the data, or by any other suitable means. CVs can be stored in a table with IVs, for instance in a table with a first column including indexes or input values, a second column including IVs (one mapped to each of the indexes), and a third or additional columns including CVs (one mapped to each index per column). Such a table is referred to herein as a "vector table". IVs and CVs are collectively referred to herein as "vectors". In some embodiments, querying a vector table with an input value results in accessing an IV and one or more CVs mapped to the input value, though it should be noted that the IV and the one or more CVs can be accessed by querying the vector table with multiple input values (for instance, one per vector table column). Vector values in a vector table column can be randomly or pseudo-randomly generated. It should be noted that although reference is made herein to vectors organized into columns and tables, the principles described herein apply to any organization of vectors, for example ordered or non-ordered sets of one or more vectors.

The detokenization of data refers to an operation performed to convert tokenized data into the data on which tokenization was performed. To detokenize data, the tokenized data is used to query the one or more token tables used to tokenize the data. For instance, if a 4-digit number is tokenized by querying a token table to identify a token mapped to the 4-digit number, and the identified token is used to replace the 4-digit number to form tokenized data, then the tokenized data can be detokenized by querying the token table with the token to identify the 4-digit number mapped to the token, and the 4-digit number can be used to replace the token to form detokenized data. Similarly, in order to detokenize data, any vector modifications performed during the course of the tokenization must be reversed. For instance, if a 4-digit number is modified by a 4-digit vector using modulo addition prior to tokenization, then to detokenize the tokenized data, modulo subtraction using the 4-digit vector must be performed after detokenization.

Tokenization System Overview

Figure 1:
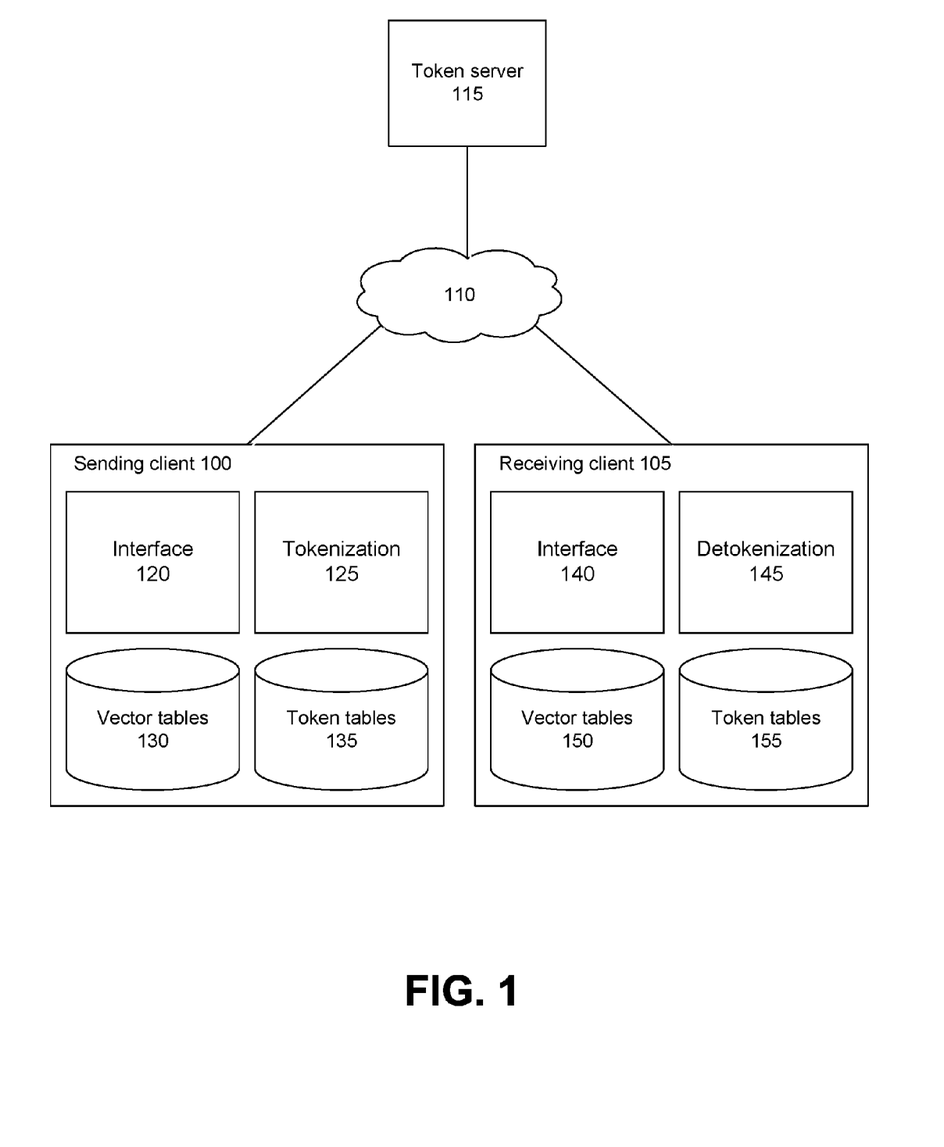
FIG. 1 is a system diagram for a tokenization environment, according to one embodiment.

FIG. 1 is a system diagram for a tokenization environment, according to one embodiment. The environment of FIG. 1 includes a sending client 100, a receiving client 105, and a token server 115, communicatively coupled via a network 110. Each of the sending client and the receiving client (the "clients", hereinafter) can be associated with a retailer, business, or other organization, though it should be noted that the clients can also be associated with individual users or any other suitable entity. The sending client can receive sensitive data, for instance a credit card number or other account number during the course of a transaction with a user, and can tokenize the sensitive data for transmission via the network to the receiving client. It should be noted that in other embodiments, the environment of FIG. 1 includes additional or different components.

The clients can include a computing device capable of processing data as well as transmitting data to and receiving data from the other modules of FIG. 1 via the network 110. For example, the clients can include a desktop computer, laptop computer, smart phone, tablet computing device, server, payment terminal, or any other device having computing and data communication capabilities. Each computing device includes one or more processors, memory, storage, and networking components. The clients are coupled to the network and can interact with other modules coupled to the network using software such as a web browser or other application with communication functionality. Such software can include an interface for communicating with the other modules via the network.

The network 110 connecting the various modules is typically the Internet, but can be any network, including but not limited to a local area network (LAN), metropolitan area network (MAN), wide area network (WAN), cellular network, wired network, wireless network, private network, virtual private network (VPN), direct communication line, and the like. The network can also be a combination of multiple different networks.

As noted above, the sending client 100 is configured to receive sensitive data and to tokenize the sensitive data for transmission to the receiving client 105. In such an embodiment, the sending client may be a payment terminal, the received sensitive data may be a credit card number, and the receiving client may be a credit card company server. Accordingly, the environment of FIG. 1 can be used in the receiving, protection, and transmission of financial information, though it should be emphasized that information other than financial information can be similarly processed.

The sending client 100 includes an interface module 120, a tokenization module 125, a vector tables storage module 130, and a token tables storage module 135. In other embodiments, the sending client includes components other than those illustrated in FIG. 1. The interface module is configured to provide an interface between entities external to the sending client and modules within the sending client. The interface module can provide a graphic user interface (GUI), for instance via a sending client display, and/or can provide a communicative interface, for instance configured to automatically route received sensitive data, vector tables, and/or token tables to modules within the sending client. The interface module can also provide an interface for communications between modules of the sending client, for instance by storing received vector tables and vector table columns within the vector tables storage module and storing received token tables in the token tables storage module. The interface module can also receive requests for tokenized data, for instance from the receiving client 105, and can provide tokenized data to the receiving client in response.

The tokenization module 125 is configured to receive sensitive data, to tokenize all or part of the received sensitive data, and to store or transmit the tokenized data. In the embodiments described herein, the tokenization module performs SLT tokenization, though it should be noted that other forms of tokenization can also be performed according to the principles described herein. The tokenization module accesses a vector table from the vector tables storage module 130, and accesses one or more token tables stored in the token tables storage module 135 for use in tokenization. In some embodiments, the tokenization module requests, via the interface module 120, one or more vector tables, vector table columns, and/or token tables from the token server 115. Vector tables and vector table columns received from the token server can be stored in the vector tables storage module, and received token tables received can be stored in the token tables storage module. It should be noted that in some embodiments, the token server periodically updates stored vector tables and/or token tables without prompting by the tokenization module, for instance by computing updated vector tables, vector table columns, or token tables based on existing vector tables, vector table columns, token tables, or based on any other suitable information.

Upon accessing a vector table or vector table columns, the tokenization module 125 modifies all or part of the sensitive data using one or more vector table column entries. For instance, the last four digits of the sensitive data may be used to query an accessed vector table, and a vector table column entry mapped to the last four digits can be accessed. Continuing with this example, the first eight digits of the sensitive data can be modified with the vector table column entry, for instance by performing modulo addition, to create modified data. The tokenization module then tokenizes all or part of the modified data by replacing one or more portions of the modified data with one or more tokens mapped to the values of the one or more portions within the accessed token tables to create tokenized data. The tokenization module can perform addition iterations of chained tokenization on the tokenized data as described below with regards to FIG. 2. After tokenization, the tokenization module can transmit the tokenized data to the receiving client 105, or can store the tokenized data for subsequent transmission.

The receiving client 105 includes an interface module 140, a detokenization module 145, a vector tables storage module 150, and a token tables storage module 155. In other embodiments, the receiving client includes components other than those illustrated in FIG. 1. The interface module is configured to perform operations similar to the interface module 120, for instance by receiving tokenized data from the sending client 100, to route received tokenized data to the detokenization module, and to receive and route vector tables, vector table columns, and token tables received from the token server 115 to the vector tables storage module and the token tables storage module. The detokenization module is configured to detokenize received tokenized data using vector tables, vector table columns, and token tables stored at the receiving client, and to request vector tables, vector table columns, and token tables from the token server as needed. In some embodiments, to detokenize received tokenized data, the detokenization module accesses the same vector tables, vector table columns, and token tables used by the tokenization module 125 to tokenize the data.

The token server 115 is configured to provide vector tables and token tables to the sending client 100 and the receiving client 105 (for use and/or replacement of vector tables and token tables stored by the clients). In some embodiments, the token server periodically provides vector tables and token tables to the clients, for instance once an hour or once a day. Alternatively, or in addition, the token server can provide vector tables and token tables to the client in response to a request from a client. For instance, the sending client can tokenize data with a set of vector tables and token tables, the receiving client can identify the set of vector tables and token tables (for instance, if the sending client includes vector table and token table identifiers in the tokenized data), and the receiving client can request the identified vector tables and token tables from the token server. In some embodiments, the token server provides multiple sets of vector tables and token tables to the clients. In such embodiments, the clients are configured to use each set of vector tables and token tables for a pre-determined period of time or a pre-determined number of tokenization operations before moving on to the next set of vector tables and token tables. As will be discussed below in greater detail, the token server can be configured to provide one or more vector table columns or token table columns to the clients for use in replacing the columns of a vector table or token table, respectfully, to create updated vector tables or token tables.

Figure 2:
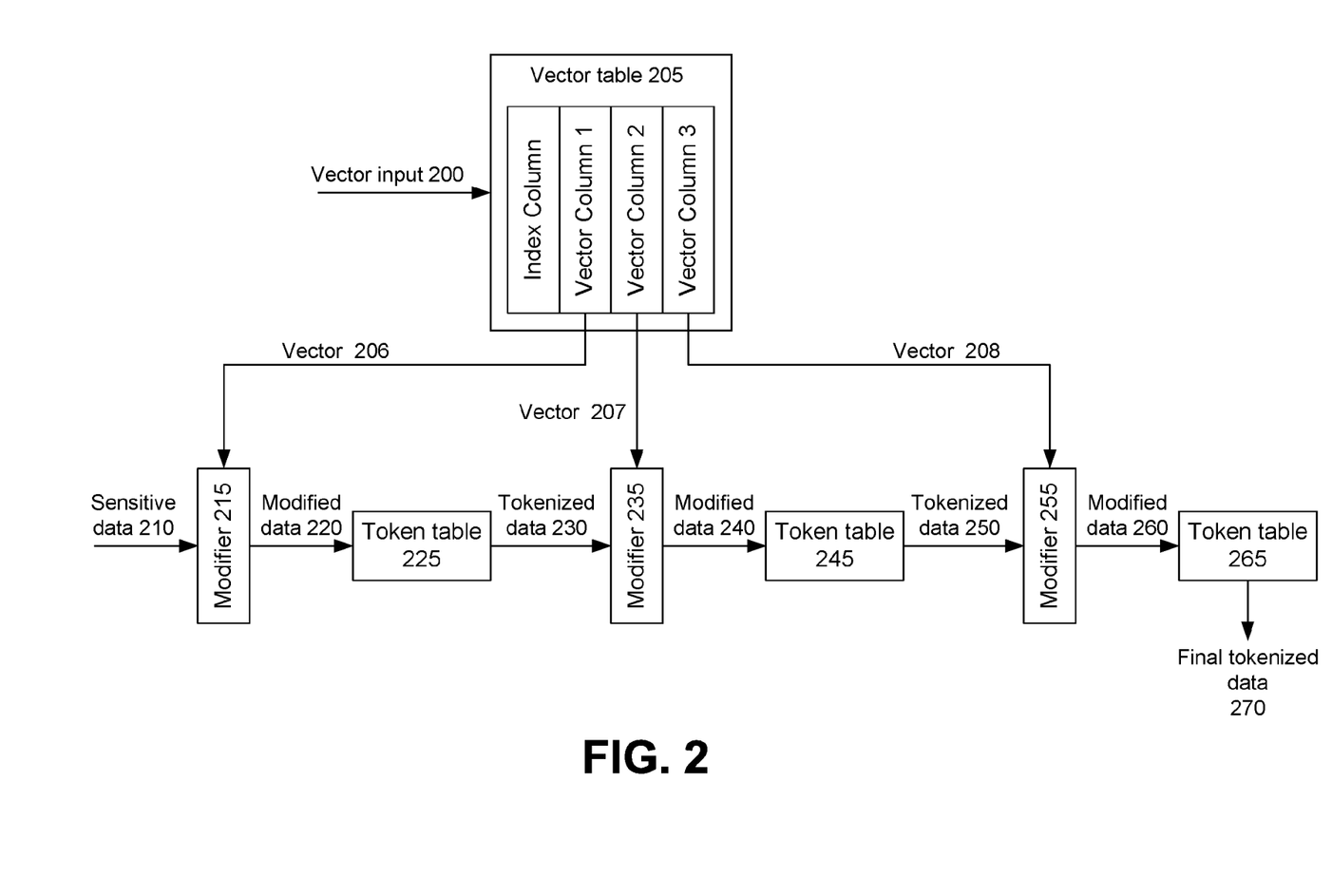
FIG. 2 illustrates an example chained tokenization operation, according to one embodiment.

FIG. 2 illustrates an example chained tokenization operation, according to one embodiment. A vector input 200 is received at a vector table 205, and sensitive data 210 is received at the modifier 215. In some embodiments, the vector input comprises a portion of the sensitive data, data associated with the sensitive data, data associated with a requested tokenization operation. In this example, the vector table includes an index column and three vector columns (vector column 1, vector column 2, and vector column 3), though any practical number of vector columns can be used depending upon the implementation. Each index column entry is mapped to a corresponding entry in each vector column (for instance, the index column entry in the $5^{th}$ row of the index column is mapped to the entries in the $5^{th}$ rows of each vector column). Accordingly, in response to being queried with the vector input, the vector table identifies an index column entry with a value equal to the value of the vector input, and outputs the values of the corresponding vector column entries. In the embodiment of FIG. 2, in response to being queried by the vector input, the vector table identifies an index column entry with a value equal to the vector input value, and outputs a corresponding vector for each of vector column 1, vector column 2, and vector column 3 (vectors 206, 207, and 208 of FIG. 2, respectively).

The modifier 215 receives the sensitive data 210 and the vector 206, and modifies the sensitive data using the vector 206 to produce modified data 220. As noted above, sensitive data can be modified using a vector in a number of ways, including modulo addition, encryption, and the like. The modified data 220 is received at a token table 225, which maps all or part of the modified data 220 to a token, and is tokenized in a first tokenization operation producing tokenized data 230.

A modifier 235 receives the tokenized data 230 and the vector 207, and modifies the tokenized data 230 using the vector 207 to produce the modified data 240. The modified data 240 is received at a token table 245 and is tokenized in a second tokenization operation producing tokenized data 250. A modifier 255 receives the tokenized data 250 and the vector 208, and modifies the tokenized data 250 using the vector 208 to produce modified data 260. The modified data 260 is received at the token table 265 and is tokenized in a third tokenization operation producing final tokenized data 270.

It should be noted that although only three tokenization operations are described in the example chained tokenization operation of FIG. 2, in practice, any number of tokenization iterations can be performed. Each tokenization iteration can include the modification of data either before or after tokenization with a vector from a vector table. In addition, although three distinct modifiers are shown in the embodiment of FIG. 2, the modification operations described herein can be performed by a single modifier, or by any number of modifiers.

Tokenization Column Replacement

At any point throughout the chained tokenization operation of FIG. 2, one or more vectors in the vector table can be replaced with a different vector, which will result in a different resulting final tokenized data. Similarly, at any point throughout the chained tokenization operation, modifying a token table to replace a token used in the chained tokenization operation with a different token will result in different final tokenized data based on the same input data than before the token replacement.

Periodically replacing one or more tokenization components in a chained tokenization operation, such as a vector in a vector table and or a token in a token table, can beneficially increase the security of the tokenization process, for instance by limiting the potential harm caused by the leaking or illicit accessing of the vector tables and token tables used to tokenize data. In other words, even if the tokenization components used to tokenize data are known by an unauthorized parties, replacing a set of tokenization components can prevent the unauthorized parties from detokenizing subsequently tokenized data.

Entire vector tables and token tables can be replaced during the execution of a chained tokenization operation. However, in some instances, vector tables and token tables are substantially large relative to available bandwidth (for instance, in offline or wireless applications). Accordingly, in such instances, replacing one or more vector table or token table columns during the execution of a chained tokenization operation can better accommodate limited bandwidth constrains, and/or can improve can reduce the amount of time required to update vector tables and token tables. As noted above, replacing a vector or token used in a chained tokenization operation can increase system security; replacing a vector column or token table column can help guarantee that a particular vector or token used in a chained tokenization operation is replaced. Accordingly, replacing one or more vector table columns or token table columns can result in an increase in system security while increasing system performance and satisfying potential bandwidth constraints.

In the embodiment of FIG. 2, replacing a vector table column (also referred to herein as simply a "vector column") can include providing a new vector column to the vector table 205, and replacing one of the vector columns 1-3 with the provided new vector column. In subsequent tokenization operations, a vector from the new vector column is provided, likely resulting in a different final tokenized data 270 (based on the input same sensitive data 210) than before the vector table column replacement. Similarly, although not shown in the embodiment of FIG. 2, a new token table column can be received, and can be used to replace a token table column in the token table 225, the token table 245, or the token table 265. It should be noted that although the remainder of the description herein is limited to the replacement of a vector table column, the same principles described herein apply equally to the replacement of a token table column.

Figure 3A:
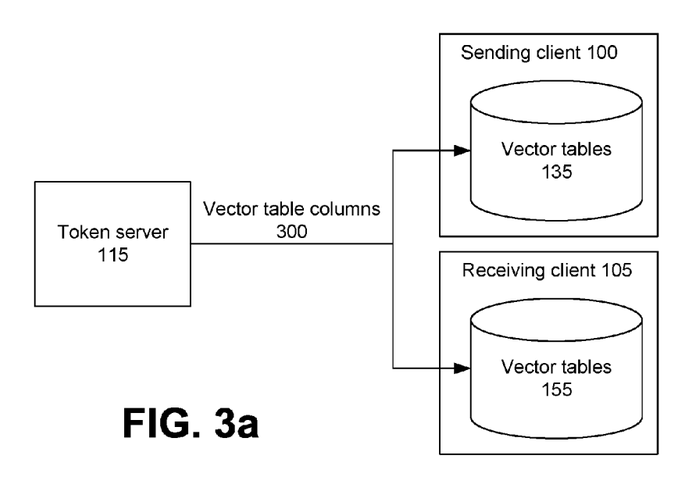
FIG. 3a illustrates an example of the replacement of a tokenization vector table column in a first tokenization environment.

In one embodiment, the replacement of vector columns and token columns is managed by the token server 115. FIG. 3a illustrates an example of the replacement of a tokenization vector table column in a first tokenization environment by the token server 115. In the embodiment of FIG. 3a, the token server 115 provides one or more new vector table columns 300 to the sending client 100 and the receiving client 105. The sending client updates one or more vector tables stored in the vector tables storage module 135 using the received new vector table columns, for instance by replacing one or more columns within the one or more vector tables with the one or more new vector table columns. Similarly, the receiving client updates one or more vector tables stored in the vector tables storage module 155 using the received vector table columns, for instance by replacing one or more columns within the one or more vector tables with the one or more vector table columns. It should be noted that although the embodiment of FIG. 3a uses the token server to provide the new vector table columns to the clients, in other embodiments, the new vector table columns can be provided by one of the clients or by an entity not shown in FIG. 3a.

The token server 115 can provide a vector table identifier and/or a vector column identifier in conjunction with each of the new vector table columns 300. For example, for a given new vector table column, the token server can provide a unique identifier for a vector table stored in the vector tables storage module 135 or 155, and can provide a unique identifier for a column of the identified vector table. Upon receiving the new vector table column and the identities of a vector table and a column, a client can access the identified vector table, and can replace the identified column in the accessed vector table with the received new vector table column.

The token server 115 can periodically update one or more vector table columns of vector tables stored at the clients, for instance once an hour, every three hours, twice a day, once a day, or once every few days. In some embodiments, the token server provides updated vector table columns automatically, while in other embodiments, the token server provides updated vector table columns only in response to a request from the sending client 100 or the receiving client 105. In some embodiments, the token server provides one or more vector table columns after a pre-determined number of tokenization operations performed by the sending client or after a pre-determined number of detokenization operations performed by the receiving client. The token server can provide vector table columns in response to a combination of time, tokenization operations, and requests from the clients. The token server can also provide vector table columns to the clients in response to a detected security breach, based on the context of a tokenization operation (such as the identify of a user or the circumstances of a transaction associated with the tokenization operation), or based on any other suitable factor.

The token server 115 can provide a set of vector table columns 300 for sequential use in updating a vector table stored at the sending client 100 or receiving client 105. For instance, the token server can provide a set of vector table columns, each associated with an interval of time (or a specific time). In response to receiving the set of vector table columns, a client can update a stored vector table with a first of the vector table columns, can update the stored vector table with a second of the vector table columns after a time interval associated with the first vector table columns has passed, can update the stored vector table with a third of the vector table columns after a time interval associated with the second vector table column has passed, and so on, or can updated the using the column for each designated time.

Similarly, the token server 115 can provide a set of vector table columns 300 each associated with a number of tokenization operations. In response to receiving the set of vector table columns, a client can update a stored vector table with a first of the vector table columns, can update the stored vector table with a second of the vector table columns after a number of tokenization operations associated with the first vector table columns has been performed, and so on. It should be noted that a set of vector table columns provided by the token server can be used to sequentially update a particular vector column in the same vector table, or can be used to update one or more different vector columns in one or more vector tables.

The token server 115 can provide updated vector table columns according to an update schedule. In some embodiments, the update schedule can be programmed by a system administrator or by a user of the tokenization systems described herein. In some embodiments, the schedule is generated based on a pre-determined security level, based on user input, or based on any other suitable factor. For example, in a "low" security mode, the update schedule may call for vector table column updates once a day, and in a "high" security mode, the update schedule may call for vector table column updates once every 10 minutes.

Figure 3B:
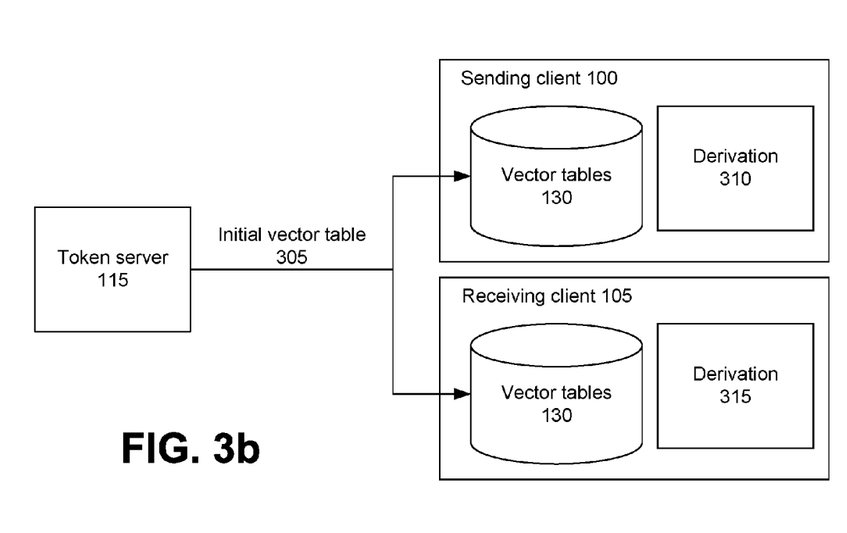
FIG. 3b illustrates an example of the replacement of a tokenization vector table column in a second tokenization environment.

Instead of receiving vector table columns from a token server 115, the sending client 100 and the receiving client 105 can generate updated vector table columns based on currently stored vector tables. FIG. 3b illustrates an example of the replacement of a tokenization vector table column in such an embodiment. In the embodiment of FIG. 3b, the sending client includes a derivation module 310, and the receiving client includes a derivation module 315. The clients receive and store an initial vector table 305. The derivation modules can subsequently generate new vector table columns based on vector table columns within the stored initial vector table. For example, the derivation modules can perform modulo addition or multiplication on the entries of an original vector table column using one or more stored modifier columns or values to generate an updated vector table column for use in replacing the original vector table column.

The derivation modules 310 and 315 can also generate updated vector tables columns based on tokenization context information (such as the identity of a user, a pre-determined security level, a time or date of tokenization, circumstances of a transaction associated with the tokenization operation), or any other suitable information. In one embodiment, the sending client 100, the receiving client 105, and the token server 115 each generate identical updated vector table columns in a pre-determined order, based on pre-determined information, according to a pre-determined protocol, and the like. In other words, the clients and the token server can have access to the same vector table columns at any given time by generating updated vector table columns in a similar order and manner.

It should be emphasized though although reference is made herein to the replacement of vector table columns with new or updated vector table columns, in some embodiments, the vector table columns being replaced are maintained by the clients or by the token server 115, for instance for subsequent use, auditing purposes, and the like.

Figure 4:
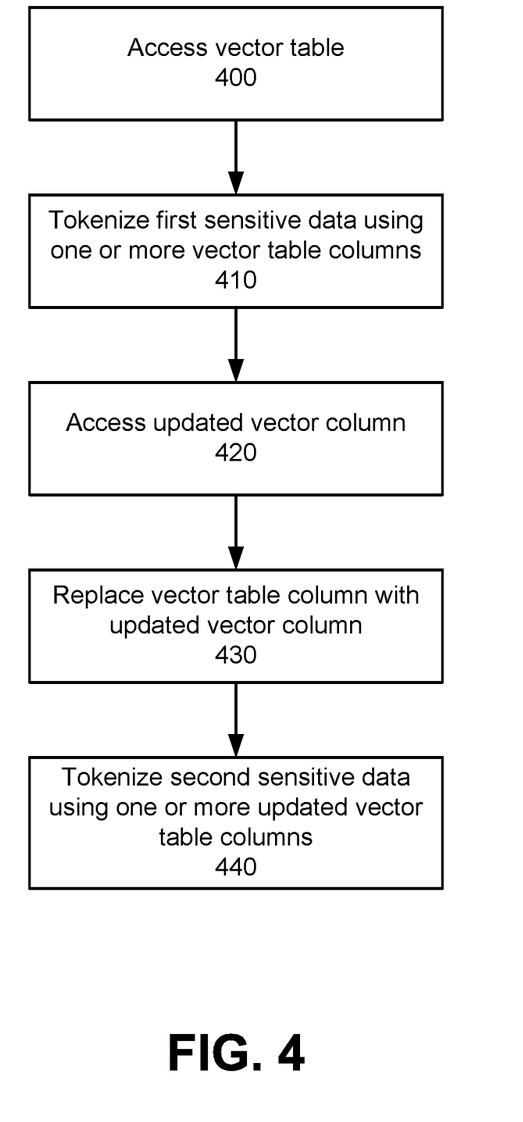
FIG. 4 is a flow chart illustrating a process of replacing a tokenization vector table column, according to one embodiment.

FIG. 4 is a flow chart illustrating a process of replacing a tokenization vector table column, according to one embodiment. A vector table is accessed 400, and is used to tokenize 410 first sensitive data using one or more vector table columns. For instance, a first portion of the first sensitive data is used to query the vector table, and an entry of a vector table column mapped to the value of the first portion of the first sensitive data within the accessed vector table is returned. The value of the returned entry is used to modify a second portion of the first sensitive data, and all or part of the modified first sensitive data is tokenized using one or more token tables.

An updated vector column is accessed 420, and is used to replace 430 a vector table column within the accessed vector table to form an updated vector table. For instance, the updated vector column can be received from a vector table server, or can be generated based upon a column of the vector table or any other suitable information. The updated vector table is used to tokenize 440 second sensitive data using one or more columns of the updated vector table. For instance, an entry of the updated vector column can be used to modify a portion of the second sensitive data prior to tokenizing the second sensitive data.

Additional Configuration Considerations

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely exemplary, and not mandatory; functions performed by a single system component may instead be performed by multiple components, and functions performed by multiple components may instead be performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determine" refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a non-transitory computer readable medium that can be accessed by the computer. Such a computer program may be stored in a computer readable storage medium, such as, but not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method for tokenizing data, comprising:
    accessing, by an input module of a tokenization system, a set of initialization vectors comprising a plurality of initialization vectors;
    tokenizing, by a tokenization engine of the tokenization system, first data using one or more initialization vectors from the set of initialization vectors to form first tokenized data;
    accessing, by the input module of the tokenization system, one or more updated initialization vectors in response to one or more of a detection of a security violation, an identity of a user associated with the first data, and a circumstance of tokenizing the first data;
    in response to a bandwidth available to the tokenization system being below a threshold bandwidth, replacing, by an update engine of the tokenization system, a subset of the set of initialization vectors with one or more updated initialization vectors to form an updated set of initialization vectors, the subset of initialization vectors including fewer initialization vectors than the set of initialization vectors; and
    tokenizing, by the tokenization engine of the tokenization system, second data using one or more initialization vectors from the updated set of initialization vectors to form second tokenized data.

2. The method of claim 1, wherein the set of initialization vectors is received from a server communicatively coupled to the tokenization system.

3. The method of claim 1, wherein tokenizing the first data using the one or more initialization vectors comprises modifying the first data to form modified first data and then tokenizing the modified first data.

4. The method of claim 3, wherein modifying the first data comprises performing modulo addition between a portion of the first data and a value of the one or more initialization vectors, and replacing the portion of the first data with the sum of the modulo addition.

5. The method of claim 3, wherein tokenizing the modified first data comprises querying an accessed token table mapping each of a plurality of token values to a different one of a plurality of input values with a value of a portion of the first modified data to identify a token value mapped to the value of the portion of the modified first data and replacing the portion of the modified first data with the identified token value.

6. The method of claim 1, wherein the one or more updated initialization vectors are accessed from a column of a vector table including a plurality of initialization vectors.

7. The method of claim 1, wherein the one or more updated initialization vectors are generated based on seed values received from a vector table.

8. A tokenization system, comprising:
a non-transitory computer-readable storage medium storing executable computer instructions configured to, when executed by a processor, perform steps comprising:
accessing, by an input module, a set of initialization vectors comprising a plurality of initialization vectors;
tokenizing, by a tokenization engine, first data using one or more initialization vectors from the set of initialization vectors to form first tokenized data;
accessing, by the input module, one or more updated initialization vectors in response to one or more of a detection of a security violation, an identity of a user associated with the first data, and a circumstance of tokenizing the first data operation;
in response to a bandwidth available to the tokenization system being below a threshold bandwidth, replacing, by an update engine, a subset of the set of initialization vectors with one or more updated initialization vectors to form an updated set of initialization vectors, the subset of initialization vectors including fewer initialization vectors than the set of initialization vectors; and
tokenizing, by the tokenization engine, second data using one or more initialization vectors from the updated set of initialization vectors to form second tokenized data; and
a processor configured to execute the instructions.

9. The tokenization system of claim 8, wherein the set of initialization vectors is received from a server communicatively coupled to the tokenization system.

10. The tokenization system of claim 8, wherein tokenizing the first data using the one or more initialization vectors comprises modifying the first data to form modified first data and then tokenizing the modified first data.

11. The tokenization system of claim 10, wherein modifying the first data comprises performing modulo addition between a portion of the first data and a value of the one or more initialization vectors, and replacing the portion of the first data with the sum of the modulo addition.

12. The tokenization system of claim 10, wherein tokenizing the modified first data comprises querying an accessed token table mapping each of a plurality of token values to a different one of a plurality of input values with a value of a portion of the modified first data to identify a token value mapped to the value of the portion of the first modified data and replacing the portion of the modified first data with the identified token value.

13. The tokenization system of claim 8, wherein the one or more updated initialization vectors are accessed from a column of a vector table including a plurality of initialization vectors.

14. The tokenization system of claim 8, wherein the one or more updated initialization vectors are generated based on seed values received from a vector table.

15. A non-transitory computer-readable storage medium storing executable computer instructions configured to, when executed by a hardware processor of a tokenization system, perform steps comprising:
accessing, by an input module of the tokenization system, a set of initialization vectors comprising a plurality of initialization vectors;
tokenizing, by a tokenization engine of the tokenization system, first data using one or more initialization vectors from the set of initialization vectors to form first tokenized data;
accessing, by the input module of the tokenization system, one or more updated initialization vectors in response to one or more of a detection of a security violation, an identity of a user associated with the first data, and a circumstance of tokenizing the first data;
in response to a bandwidth available to the tokenization system being below a threshold bandwidth, replacing, by an update engine of the tokenization system, a subset of the set of initialization vectors with the one or more updated initialization vectors to form an updated set of initialization vectors, the subset of initialization vectors including fewer initialization vectors than the set of initialization vectors; and
tokenizing, by the tokenization engine of the tokenization system, second data using one or more initialization vectors from the updated set of initialization vectors to form second tokenized data.

16. The non-transitory computer-readable storage medium of claim 15, wherein the set of initialization vectors is received from a server communicatively coupled to the tokenization system.

17. The non-transitory computer-readable storage medium of claim 15, wherein tokenizing the first data using the one or more initialization vectors comprises modifying the first data to form modified first data and then tokenizing the modified first data.

18. The non-transitory computer-readable storage medium of claim 17, wherein modifying the first data comprises performing modulo addition between a portion of the first data and a value of the one or more initialization vectors, and replacing the portion of the first data with the sum of the modulo addition.

19. The non-transitory computer-readable storage medium of claim 17, wherein tokenizing the modified first data comprises querying an accessed token table mapping each of a plurality of token values to a different one of a plurality of input values with a value of a portion of the modified first data to identify a token value mapped to the value of the portion of the modified first data and replacing the portion of the first modified data with the identified token value.

20. The non-transitory computer-readable storage medium of claim 15, wherein the one or more updated initialization vectors are accessed from a column of a vector table including a plurality of initialization vectors.

* * * * *